US006703436B2

(12) United States Patent
Lee et al.

(10) Patent No.: US 6,703,436 B2
(45) Date of Patent: Mar. 9, 2004

(54) NEOPENTYLGLYCOL ESTER BASED PLASTICIZER COMPOSITION FOR POLYVINYL CHLORIDE RESIN AND METHOD OF PROCESS THEREOF

(75) Inventors: Kye-Seok Lee, Daejeon (KR); Kyu-Il Lee, Daejeon (KR); Hyun-Kyu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/258,278

(22) PCT Filed: Dec. 7, 2001

(86) PCT No.: PCT/KR01/02128

§ 371 (c)(1),
(2), (4) Date: Oct. 23, 2002

(87) PCT Pub. No.: WO02/068522

PCT Pub. Date: Sep. 6, 2002

(65) Prior Publication Data

US 2003/0061969 A1 Apr. 3, 2003

(30) Foreign Application Priority Data

Feb. 23, 2001 (KR) .......................................... 2001-9230

(51) Int. Cl.[7] .............................................. C08L 5/103
(52) U.S. Cl. .................... 524/306; 524/567; 524/569; 524/293; 524/299; 524/321; 106/505; 585/600; 585/438
(58) Field of Search ................................ 524/567, 569, 524/293, 299, 321, 306; 106/505; 585/600, 438

(56) References Cited

U.S. PATENT DOCUMENTS

| | | | | |
|---|---|---|---|---|
| 3,331,802 A | * | 7/1967 | Huber et al. ................ | 260/31.6 |
| 3,700,957 A | * | 10/1972 | Daniels ....................... | 260/31.6 |
| 4,053,491 A | * | 10/1977 | Koch et al. ................ | 260/410.6 |
| 4,259,225 A | * | 3/1981 | Saito et al. ............. | 260/31.8 B |
| 4,313,866 A | | 2/1982 | Renshaw | |
| 4,316,832 A | | 2/1982 | Walkden | |
| 4,444,931 A | * | 4/1984 | Lu et al. ..................... | 524/227 |
| 4,753,975 A | * | 6/1988 | Vanderkooi et al. ........ | 524/539 |
| 4,824,990 A | * | 4/1989 | Mertz et al. .................. | 560/90 |
| 5,302,650 A | * | 4/1994 | Ito .............................. | 524/298 |
| 6,624,285 B2 | * | 9/2003 | Holzmann et al. .......... | 528/300 |
| 2003/0061969 A1 | * | 4/2003 | Lee et al. .................... | 106/505 |

FOREIGN PATENT DOCUMENTS

| | | | | |
|---|---|---|---|---|
| JP | 63-51439 A | * | 3/1988 | ........... C08L/27/06 |
| JP | 4-202850 A | * | 7/1992 | ........ D06M/13/224 |
| JP | 7-126466 A | * | 5/1995 | ........... C08L/27/06 |
| JP | 2002-12568 A | * | 1/2002 | ........... C07C/29/76 |
| WO | WO 02/068522 A1 | * | 9/2002 | ............ C08K/5/10 |

* cited by examiner

Primary Examiner—Peter D. Mulcahy
Assistant Examiner—Rip A Lee
(74) Attorney, Agent, or Firm—Birch, Stewart, Kolasch & Birch, LLP

(57) ABSTRACT

The present invention relates to a plasticizer composition, and more particularly a plasticizer composition comprising neopentylglycol ester capable of being using as plasticizer of polyvinyl chloride resin, and method of prepation thereof. The plasticizer composition of the present invention can prepare polyvinyl chloride resin having superior tensile strength, elongation, static heat resistance, and viscosity stability etc.

7 Claims, No Drawings

NEOPENTYLGLYCOL ESTER BASED PLASTICIZER COMPOSITION FOR POLYVINYL CHLORIDE RESIN AND METHOD OF PROCESS THEREOF

This application is the national phase under 35 U.S.C. §371 of PCT International Application No. PCT/KR01/02128 which has an International filing date of Dec. 7, 2001, which designated the United States of America.

BACKGROUND OF THE INVENTION (a) Field of the Invention

The present invention relates to a plasticizer composition, and particularly to a neopentylglycol ester plasticizer composition used for processing polyvinyl chloride resin and a process for preparing the same.

(b) Description of the Related Art

Polyvinyl chloride resin (PVC) is a common resin capable of realizing various physical processing properties by the appropriate mixing of various additives such as a plasticizer, a stabilizer, a filler, a pigment, etc. These various physical processing properties allow polyvinyl chloride resin to be extensively used as a material for various products such as pipe, electric wire, artificial leather, wallpaper, gloves, toys, etc. In addition, a plasticizer is an essential additive that, if added to polyvinyl chloride resin, gives a variety of physical properties and functions such as processability, flexibility, electric insulation property, etc.

Representative plasticizers used for processing polyvinyl chloride resin are phthalates, adipates, trimellitates, etc. One of the phthalates, di-2-ethylhexylphthalte (DEHP), is most commonly used, and it can also function as a standard plasticizer for evaluating performance of other plasticizers.

Neopentylglycol ester is used for enhancing miscibility of coolants or giving appropriate viscosity (U.S. Pat. No. 5,470,497), and it is used as an additive for brake fluid (Japanese Laid-open Patent Publication No. Sho 59-68248).

As mentioned above, neopentylglycol ester is mainly used for enhancing miscibility and optimizing viscosity, but it also has a plasticizer use. It has been recorded that a mono-ingredient ester, synthesized from neopentylglycol ester and an aliphatic compound such as butyric acid, 2-ethylhexanoic acid, etc. can be used as a plasticizer, but it is inferior to the existing plasticizers such as 2-ethylhexylphthalate in processing properties and it is not very compatible with polyvinyl chloride resin in plastisol processing.

SUMMARY OF THE INVENTION

The present invention is made in consideration of the problems of the prior art, and it is an object of the present invention to provide a multi-ingredient neopentylglycol ester plasticizer composition that is used as a plasticizer for preparing a processing product of polyvinyl chloride resin that has excellent tensile strength, elongation, static heat resistance, and viscosity stability.

In order to achieve these objects, the present invention provides a plasticizer composition comprising at least 3 kinds of neopentylglycol esters represented by the following Chemical Formula 1:

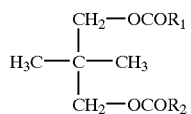

[Chemical Formula 1]

(wherein $R_1$ and $R_2$ are independently a phenyl group or a C3–12 alkyl group, and preferably a C6–8 alkyl group).

In addition, the present invention provides a process for preparing the neopentylglycol ester plasticizer composition, and a polyvinyl chloride resin comprising the plasticizer composition.

DETAILED DESCRIPTION AND THE PREFERRED EMBODIMENTS

The present invention will now be explained in more detail.

In plastisol processing, physical properties related to viscosity, namely initial sol viscosity and viscosity stability of sol, are important. Since plastisol processing products such as toys, taporin, etc. require different viscosity properties, plastisol processing requires appropriate viscosity control. The present invention provides a plasticizer for a polyvinyl chloride resin, and particularly a neopentylglycol ester mixture used for a plasticizer in plastisol processing.

The neopentylglycol (NPG) ester mixture includes a) 2-ethylhexanoic acid 3-(2-ethylhexanoyloxy)-2,2-dimethylpropyl ester, b) benzoic acid 3-(2-ethylhexanoyloxy)-2,2-dimethylol ester, and c) benzoic acid 3-benzoyloxy-2,2-dimethylpropyl ester. These three different kinds of esters can be represented by the neopentylglycol ester compound of the following Chemical Formula 1.

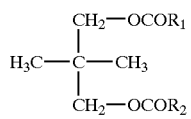

[Chemical Formula 1]

(wherein $R_1$ and $R_2$ are independently a phenyl group or a C3–12 alkyl group, and preferably a C6–8 alkyl group).

The mixture preferably comprises 5 to 30 wt % of 2-ethylhexanoic acid 3-(2-ethylhexanoyloxy)-2,2-dimethylpropyl ester, 30 to 50 wt % of benzoic acid 3-(2-ethylhexanoyloxy)-2,2-dimethylpropyl ester, and 20 to 50 wt % of benzoic acid 3-benzoyloxy-2,2-dimethylpropyl ester.

The neopentylglycol ester plasticizer of the present invention, which allows excellent processing properties such as tensile strength, elongation, static heat resistance, and viscosity stability, when used for a plasticizer during processing of a polyvinyl chloride resin, is prepared by reacting benzoic acid and 2-ethylhexanoic acid with neopentylglycol.

The neopentylglycol ester mixture of the present invention, if added to polyvinyl chloride resin and processed, has tensile strength, elongation, static heat resistance, and viscosity stability that are superior to 2-ethylhexylphthalate, which is a standard plasticizer.

Mono-ingredient neopentylglycol esters, for example esters prepared by reacting neopentylglycol with C12 aliphatic acid, i.e., lauric acid, 2-ethylhexanoic acid, or benzoic acid, are difficult to use as a plasticizer in plastisol processing because they do not have compatibility with polyvinyl chloride.

Meanwhile, multi-ingredient neopentylglycol esters exhibit different physical properties according to the kinds and compositions of alcohol and monocarboxylic acid. For example, a multi-ingredient ester prepared by reacting isobutyric acid and benzoic acid with neopentylglycol has excellent operational efficiency because it has a low molecular weight, but it is inferior in static heat resistance and viscosity stability. On the other hand, a multi-ingredient ester prepared by reacting 2-ethylhexanoic acid and benzoic acid with neopentylglycol shows a great difference in tensile strength, elongation, and static heat resistance according to the compositions thereof, but little difference in viscosity stability.

As mentioned above, it is difficult for multi-ingredient esters as well as mono-ingredient esters to effect all physical properties such as compatibility with polyvinyl chloride, viscosity stability, static heat resistance, tensile strength, elongation, etc., and thus it is important to selectively synthesize acid and alcohol in an appropriate composition.

In addition, the viscosity stability of a plastisol is influenced by the structures of ester and polyvinyl chloride resin. An aliphatic acid ester is superior to an aromatic acid ester in viscosity stability.

Accordingly, in the present invention, a multi-ingredient neopentylglycol ester mixture with an appropriate composition is prepared from neopentylglycol and an appropriate acid and alcohol, i.e., the aliphatic acid 2-ethylhexanoic acid and the aromatic acid benzoic acid.

The neopentylglycol ester plasticizer is preferably prepared according to the following process.

In order to prepare a plasticizer composition comprising at least three kinds of neopentylglycol esters represented by the Chemical Formula 1, i) 10 to 30 wt % of neopentylglycol, ii) 20 to 50 wt % of 2-ethylhexanoic acid, iii) 20 to 60 wt % of benzoic acid, iv) 1 to 10 wt % of xylene, and v) 0.05 to 1 wt % of tetraisopropyltitanate are introduced into a flask equipped with an agitator and a condenser to react them at 200 to 300° C. for 4 to 15 hours. Unreacted acids are removed by decompressing with a vacuum pump, neutralizing the reactant with 5 to 15 wt % of sodium hydroxide, and washing the neutralized reactant with water then decompressing and dehydrating it. An absorbent is added to the reactant and the reactant is filtered to obtain a final product, neopentylglycol ester plasticizer.

During the above process, the iv) xylene is an entrainer, and the v) tetraisopropyltitanate acts as a catalyst.

In addition, the present invention provides a polyvinyl chloride resin using the neopentylglycol ester composition as a plasticizer, which has excellent tensile strength, elongation, static heat resistance, viscosity stability, etc.

The present invention will now be explained in more detail with reference to the following Examples and Comparative Examples. However, these are to illustrate the present invention and the present invention is not limited to them.

EXAMPLES

Example 1

Preparation of Neopentylglycol Ester Plasticizer Composition

To a round flask equipped with an agitator and a condenser, 291.62 g (2.8 mol) of neopentylglycol, 444.17 g (3.08 mol) of 2-ethylhexanoic acid, 376.16 g (3.08 mol) of benzoic acid, 60 g of xylene as an entrainer, and 2.05 g of tetraisopropyltitanate as a catalyst were added, and temperature of the mixture was elevated to 220° C. and they were reacted for 10 hours.

After the reaction, unreacted acids were removed by first decompressing to 2 mmHg with a vacuum pump at 200° C. The reactant was then neutralized with 5 wt % of sodium hydroxide, washed with water, and dehydrated. An absorbent was added thereto and the reactant was filtered to obtain a neopentylglycol ester mixture.

The compositional ratio of the mixture was 20.7 wt % of 2-ethylhexanoic acid 3-(2-ethylhexanoyloxy)-2,2-dimethylpropyl ester, 48.7 wt % of benzoic acid 3-(2-ethylhexanoyloxy)-2,2-dimethylpropyl ester, 28.3 wt % of benzoic acid 3-benzoyloxy-2,2-dimethylpropyl ester, and 2.0 wt % of other ingredients.

Processing of Polyvinyl Chloride Resin

In order to measure physical properties of the neopentylglycol ester mixture obtained in the above step as a plasticizer, samples were prepared for an ASTM D638 test. Namely, 60 phr of the above-obtained neopentylglycol ester mixture and 3 phr of calcium-zinc stabilizer (Korean DaeHyup Inc. Product name LTX-620S) were added to polyvinyl chloride resin (LG Chemical Inc. Product name LP010), and the reactant was agitated at 300 rpm for 10 minutes, defoamed with a defoamer until bubbles were completely removed, and it was applied to a thickness of 0.05 mm on a release paper. After pregelling at 160° C. for 3 minutes and gelling at 205° C. for 3 minutes in an oven, a plurality of dumbbell-type samples of type C were prepared.

Physical Properties Test

Tensile strength and elongation of the above samples were measured according to the ASTM D638 method. Namely, tensile strength and elongation were measured at a point when a sample was cut after drawing cross head speed to 500 mm/min using U.T.M test equipment. Tensile strength (kgf/mm$^2$) was calculated by load value (kgf)/thickness (mm)×width (mm), and elongation (%) was calculated by extension/initial length×100.

Initial plastisol viscosity was measured at 10 RPM using a Brookfield viscometer, after agitating polyvinyl chloride resin (LG Chemical Inc. Product name LP010), 60 phr of the above-obtained neopentylglycol ester mixture, and 3 phr of calcium-zinc stabilizer (Korean DaeHyup Inc. Product name LTXC-620S) at 3000 rpm for 10 minutes and storing it in an incubator for 1 hour. Viscosity stability of a plastisol was evaluated by measuring viscosity at each of 1 to 7 days in an incubator. The sol viscosity was measured at 10 rpm using spindle No. 5 at 25° C.

Static heat resistance was measured using a Mathis oven. A sample of 40 cm×2 cm was introduced into the Mathis oven at 195° C., it was removed in 30 mm increments at 3-minutes intervals, and appearance changes such as color were evaluated on the basis of a standard plasticizer 2-ethylhexylphthalate. The results are shown in Table 1.

Example 2

A neopentylglycol ester mixture was prepared by the same method as in Example 1, except that 208.3 g (2 mol) of neopentylglycol, 259.6 g (1.8 mol) of 2-ethylhexanoic acid, and 317.5 g (2.6 mol) of benzoic acid were used as raw materials, and 1.73 g of tetraisopropyltitanate were used as a catalyst. A sample was manufactured using it as a plasticizer by the same method as in Example 1, physical properties thereof were measured, and the results are shown in Table 1.

The compositional ratio of the ester mixture was 14.8 wt % of 2-ethylhexanoic acid 3-(2-ethylhexanoyloxy)-2,2-dimethylpropyl ester, 47.4 wt % of benzoic acid 3-(2-ethylhexanoyloxy)-2,2-dimethylpropyl ester, 37.1 wt % of benzoic acid 3-benzoyloxy-2,2-dimethylpropyl ester, and 0.7 wt % of other ingredients.

Example 3

A neopentylglycol ester mixture was prepared by the same method as in Example 1, except that 208.3 g (2 mol) of neopentylglycol, 201.9 g (1.4 mol) of 2-ethylhexanoic acid, and 366.4 g (3 mol) of benzoic acid were used as raw materials, and 1.70 g of tetraisopropyltitanate were used as a catalyst. A sample was manufactured using it as a plasticizer by the same method as in Example 1, physical properties thereof were measured, and the results are shown in Table 1.

The compositional ratio of the ester mixture was 9.0 wt % of 2-ethylhexanoic acid 3-(2-ethylhexanoyloxy)-2,2-dimethylpropyl ester, 42.6 wt % of benzoic acid 3-(2-ethylhexanoyloxy)-2,2-dimethylpropyl ester, 46.8 wt % of benzoic acid 3-benzoyloxy-2,2-dimethylpropyl ester, and 1.6 wt % of other ingredients.

Comparative Example 5

A neopentylglycol ester mixture was prepared by the same method as in Example 1, except that 312.5 g (3 mol) of neopentylglycol and 781.7 g (6.4 mol) of benzoic acid were used as raw materials, and 2.35 g of tetraisopropyltitanate were used as a catalyst. A sample was manufactured using it as a plasticizer, physical properties thereof were measured, and the results are shown in Table 1.

TABLE 1

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
| Tensile Strength (kgf/mm$^2$) | | 1.76 | 1.80 | 1.95 | 1.66 | 1.55 | No Compatibility | No Compatibility | No Compatibility |
| Elongation (%) | | 429 | 398 | 375 | 411 | 381 | | | |
| Static Heat Resistance | | Superior | Equal | Equal | Standard | Inferior | | | |
| Sol Viscosity Change (cp) | Initial | 2650 | 3720 | 5720 | 3680 | 2640 | | | |
| | 1 | 3560 | 4480 | 6840 | 5080 | 9800 | | | |
| | 3 | 4480 | 6240 | 8000 | 6080 | 153000 | | | |
| | 5 | 4520 | 6420 | 9240 | 6360 | 17000 | | | |
| | 7 | 5400 | 7400 | 10480 | 7560 | 20360 | | | |

Comparative Example 1

The most commonly used plasticizer, di-2-ethylhexylphthalate (LG Chemical Inc. product name DOP), was used to prepare a sample, physical properties thereof were measured by the same method as in Example 1, and the results are shown in Table 1.

Comparative Example 2

A neopentylglycol ester mixture was prepared by the same method as in Example 1, except that 208.3 g (2 mol) of neopentylglycol, 268.7 g (2.2 mol) of benzoic acid, and 193.8 g (2.2 mol) of isobutyric acid were used as raw materials, and 1.39 g of tetraisopropyltitanate were used as a catalyst. A sample was manufactured using it as a plasticizer, physical properties thereof were measured, and the results are shown in Table 1.

Comparative Example 3

A neopentylglycol ester mixture was prepared by the same method as in Example 1, except that 124.98 g (1.2 mol) of neopentylglycol and 449.94 g (3.12 mol) of 2-ethylhexanoic acid were used as raw materials, and 1.35 g of tetraisopropyltitanate were used as a catalyst. A sample was manufactured using it as a plasticizer, physical properties thereof were measured, and the results are shown in Table 1.

Comparative Example 4

A neopentylglycol ester mixture was prepared by the same method as in Example 1, except that 124.98 g (1.2 mol) of neopentylglycol and 500.8 g (2.5 mol) of lauric acid were used as raw materials, and 2.10 g of tetraisopropyltitanate were used as a catalyst. A sample was manufactured using it as a plasticizer, physical properties thereof were measured, and the results are shown in Table 1.

As shown in Table 1, the mixture of Example 1 prepared by reacting 2-ethylhexanoic acid and benzoic acid with neopentylglycol exhibited superior physical properties as a plasticizer in plastisol processing, namely tensile strength, elongation, static heat resistance, and viscosity stability, than di-2-ethylhexylphthalate used as a standard plasticizer.

In addition, the mixtures of Examples 2 and 3, which differ from that of Example 1 only in their compositional ratios, exhibited equal or better physical properties as a plasticizer than a standard plasticizer di-2-ethylhexylphthalate (Comparative Example 1).

Meanwhile, the ester of Comparative Example 2, prepared by reacting 2-ethylhexanoic acid and isobutyric acid with neopentylglycol, showed a low molecular weight and good operational efficiency but other physical properties as a plasticizer were poor. In addition, the mono-ingredient ester of Comparative Example 3 prepared by reacting 2-ethylhexanoic acid with neopentylglycol, that of Comparative Example 4 prepared by reacting C12 aliphatic acid lauric acid with neopentylglycol, and that of Comparative Example 5 prepared by reacting benzoic acid with neopentylglycol did not have compatibility with polyvinyl chloride resin in plastisol processing, and thus they are difficult to use as plasticizers.

As can be seen from these results, multi-ingredient neopentylglycol ester mixtures, particularly those prepared by reacting 2-ethylhexanoic acid and benzoic acid with neopentylglycol in compositional ratios according to the present invention, can be used as plasticizers in polyvinyl chloride processing to prepare a processing product of polyvinyl chloride resin with excellent physical properties.

The plasticizer composition of the present invention can therefore be used as a plasticizer for polyvinyl chloride resin to prepare a processing product of polyvinyl chloride resin having excellent tensile strength, elongation, static heat resistance, and viscosity stability.

What is claimed is:

1. A plasticizer composition comprising at least three kinds of neopentylglycol esters represented by the following Chemical Formula 1:

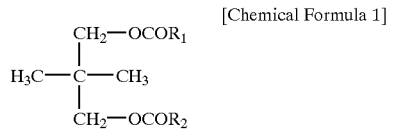

[Chemical Formula 1]

(wherein $R_1$ and $R_2$ are independently a phenyl group or a C3–12 alkyl group).

2. The plasticizer composition according to claim 1, comprising
   a) 2-ethylhexanoic acid 3-(2-ethylhexanoyloxy)-2,2-dimethylpropyl ester;
   b) benzoic acid 3-(2-ethylhexanoyloxy)-2,2-dimethylpropyl ester; and
   c) benzoic acid 3-benzoyloxy-2,2-dimethylpropyl ester.

3. The plasticizer composition according to claim 2, comprising
   a) 5 to 30 wt % of 2-ethylhexanoic acid 3-(2-ethylhexanoyloxy)-2,2-dimethylpropyl ester;
   b) 30 to 50 wt % of benzoic acid 3-(2-ethylhexanoyloxy)-2,2-dimethylpropyl ester; and
   c) 20 to 50 wt % of benzoic acid 3-benzoyloxy-2,2-dimethylpropyl ester.

4. The plasticizer composition according to claim 1, wherein the composition is prepared by reacting
   i) 10 to 30 wt % of neopentylglycol;
   ii) 20 to 50 wt % of 2-ethylhexanoic acid;
   iii) 20 to 60 wt % of benzoic acid;
   iv) 1 to 10 wt % of xylene; and
   v) 0.01 to 1 wt % of tetraisopropyltitanate at 200 to 300° C. for 4 to 15 hours.

5. A process for preparing the neopentylglycol ester plasticizer composition of claim 1, comprising the step of
   a) reacting
      i) 10 to 30 wt % of neopentylglycol;
      ii) 20 to 50 wt % of 2-ethylhexanoic acid;
      iii) 20 to 60 wt % of benzoic acid;
      iv) 1 to 10 wt % of xylene; and
      v) 0.01 to 1 wt % of tetraisopropyltitanate at 200 to 300° C. for 4 to 15 hours.

6. The process according to claim 5, further comprising the steps of
   b) decompressing unreacted acids of a) with a vacuum pump;
   c) neutralizing the reactant of b) with 5 to 15 wt % of sodium hydroxide; and
   d) washing the reactant of c) with water, decompressing and dehydrating it, adding an absorbent to the dehydrated reactant, and filtering it.

7. A polyvinyl chloride resin comprising a plasticizer composition according to any one of claims 1 to 4.

* * * * *